United States Patent
Fulton et al.

(10) Patent No.: US 10,406,958 B2
(45) Date of Patent: Sep. 10, 2019

(54) COMBINATION CLOSURE AND TABLETOP FOR A VEHICLE HAVING A LOAD-CARRYING BED AND METHOD

(71) Applicant: Honda Motor Co., Ltd., Tokyo (JP)

(72) Inventors: Benjamin A. Fulton, Dublin, OH (US); Brian A. Penza, Dublin, OH (US); Christopher R. Freeman, Dublin, OH (US); Jared S. Kauffman, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 15/864,363

(22) Filed: Jan. 8, 2018

(65) Prior Publication Data

US 2019/0210502 A1 Jul. 11, 2019

(51) Int. Cl.
*B60R 5/04* (2006.01)
*B60N 3/00* (2006.01)

(52) U.S. Cl.
CPC ............... *B60N 3/001* (2013.01); *B60R 5/04* (2013.01)

(58) Field of Classification Search
CPC .................................. B60N 3/001; B60R 5/04
USPC ........................................................ 296/37.6
See application file for complete search history.

(56) References Cited

U.S. PATENT DOCUMENTS

| | | |
|---|---|---|
| 3,338,620 A | 8/1967 | Cauvin |
| 3,709,159 A | 1/1973 | Oglesby, Jr. |
| 4,452,151 A * | 6/1984 | Jarrard ...................... B60R 5/04 108/42 |
| 4,962,709 A | 10/1990 | Huber |
| 5,080,417 A * | 1/1992 | Kanai ....................... B60R 5/04 296/37.14 |
| 5,992,331 A | 11/1999 | Inoue et al. |
| 6,125,772 A | 10/2000 | Clements |
| 6,155,625 A * | 12/2000 | Felix ........................ B60R 9/00 296/37.1 |
| 6,471,277 B1 | 10/2002 | Scensny et al. |
| 6,722,290 B2 | 4/2004 | Wetterlund |
| 6,880,875 B2 | 4/2005 | McClure et al. |
| 7,374,221 B2 | 5/2008 | McClure et al. |

(Continued)

FOREIGN PATENT DOCUMENTS

| | | |
|---|---|---|
| DE | 4340675 | 6/1995 |
| DE | 102011101615 | 11/2012 |

(Continued)

*Primary Examiner* — Pinel E Romain
(74) *Attorney, Agent, or Firm* — Rankin, Hill & Clark LLP

(57) ABSTRACT

A combination closure and tabletop for a vehicle having a load-carrying bed and method includes a closure body pivotally and removably connected to a bed floor of the vehicle that defines a load bearing surface of a load-carrying bed on the vehicle. The closure body is connected to the bed floor when in a closure state for selectively providing and inhibiting access to a storage compartment disposed below the bed floor. The closure body is removable from the bed floor when in a tabletop state for use in a tabletop configuration. When in the closure state, the closure body is pivotable from the pivot closed position to a pivot open position. The pivot closed position is for inhibiting access into the storage compartment. The pivot open position is for providing access into the storage compartment. When in the tabletop state, the closure body is usable as a tabletop and access is provided into the storage compartment.

20 Claims, 5 Drawing Sheets

(56) References Cited

U.S. PATENT DOCUMENTS 7,819,453 B2    10/2010   Edwards
8,534,736 B1 *   9/2013   Whalen .................. B60R 5/045
                                                                296/37.14

FOREIGN PATENT DOCUMENTS

| EP | 2495132 | 9/2012 |
| KR | 19980035662 | 9/1998 |
| WO | 2015026077 | 2/2015 |

* cited by examiner

COMBINATION CLOSURE AND TABLETOP FOR A VEHICLE HAVING A LOAD-CARRYING BED AND METHOD

BACKGROUND

It is known for a vehicle to include a lid that covers a storage area (e.g., a spare tire storage area) in a rear portion of the vehicle in which the lid is removable from a storage area. Some such lids include folding legs on undersides thereof to enable the lid to be used as a table outside the vehicle. In these known vehicles, the removable lid is typically provided within the vehicle cabin, such as behind the rear row of seats in a cargo floor area forward of the vehicle's rear tailgate that provides access to this cargo area.

SUMMARY

According to one aspect, a vehicle body having a load-carrying bed includes a bed floor defining a load bearing surface of the load-carrying bed, a storage compartment disposed below the bed floor and accessible through an opening defined in the bed floor, and a combination closure and tabletop pivotally and removably connected to the bed floor for selectively closing the storage compartment. The combination closure and tabletop is pivotable, when connected to the bed floor, between a pivot closed position for closing access to the storage compartment and a pivot open position for allowing access to the storage compartment. The combination closure and tabletop is removable from the bed floor for use in a tabletop configuration when disconnected from the bed floor.

According to another aspect, a combination closure and tabletop for a vehicle includes a closure body pivotally and removably connected to a bed floor of the vehicle that defines a load bearing surface of a load-carrying bed on the vehicle. The closure body is connected to the bed floor when in a closure state for selectively providing and inhibiting access to a storage compartment disposed below the bed floor. The closure body is removable from the bed floor when in a tabletop state for use in a tabletop configuration. When in the closure state, the closure body is pivotable from the pivot closed position to a pivot open position with the pivot closed position for inhibiting access into the storage compartment and the pivot open position for providing access into the storage compartment. When in the tabletop state, the closure body is usable as a tabletop and access is provided into the storage compartment.

According to a further aspect, a method for using a combination closure and tabletop in a vehicle includes pivoting the combination closure and tabletop from a pivot closed position to a pivot open position, wherein the combination closure and tabletop closes a storage compartment disposed below an exterior bed floor of the vehicle when in the pivot closed position. The method further includes disconnecting the combination closure and tabletop from the bed floor and remotely using the combination closure and tabletop in a tabletop configuration.

DETAILED DESCRIPTION

Figure 1:
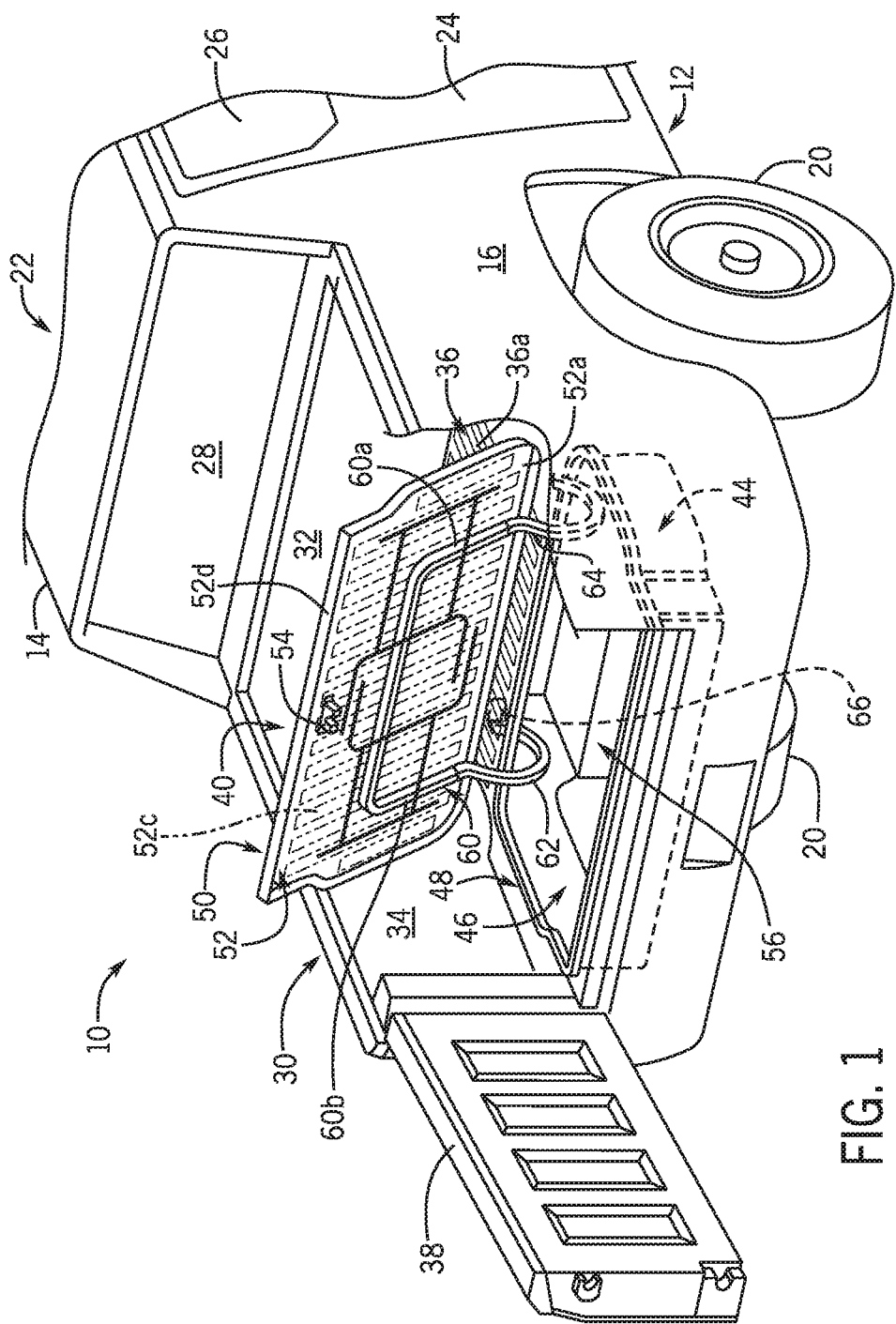
FIG. 1 is a partial perspective view of a vehicle with a vehicle body having a load-carrying bed with a combination closure and tabletop pivotally and removably connected to the bed according to an exemplary embodiment, the combination closure and tabletop shown in a pivot open position.
Figure 2:
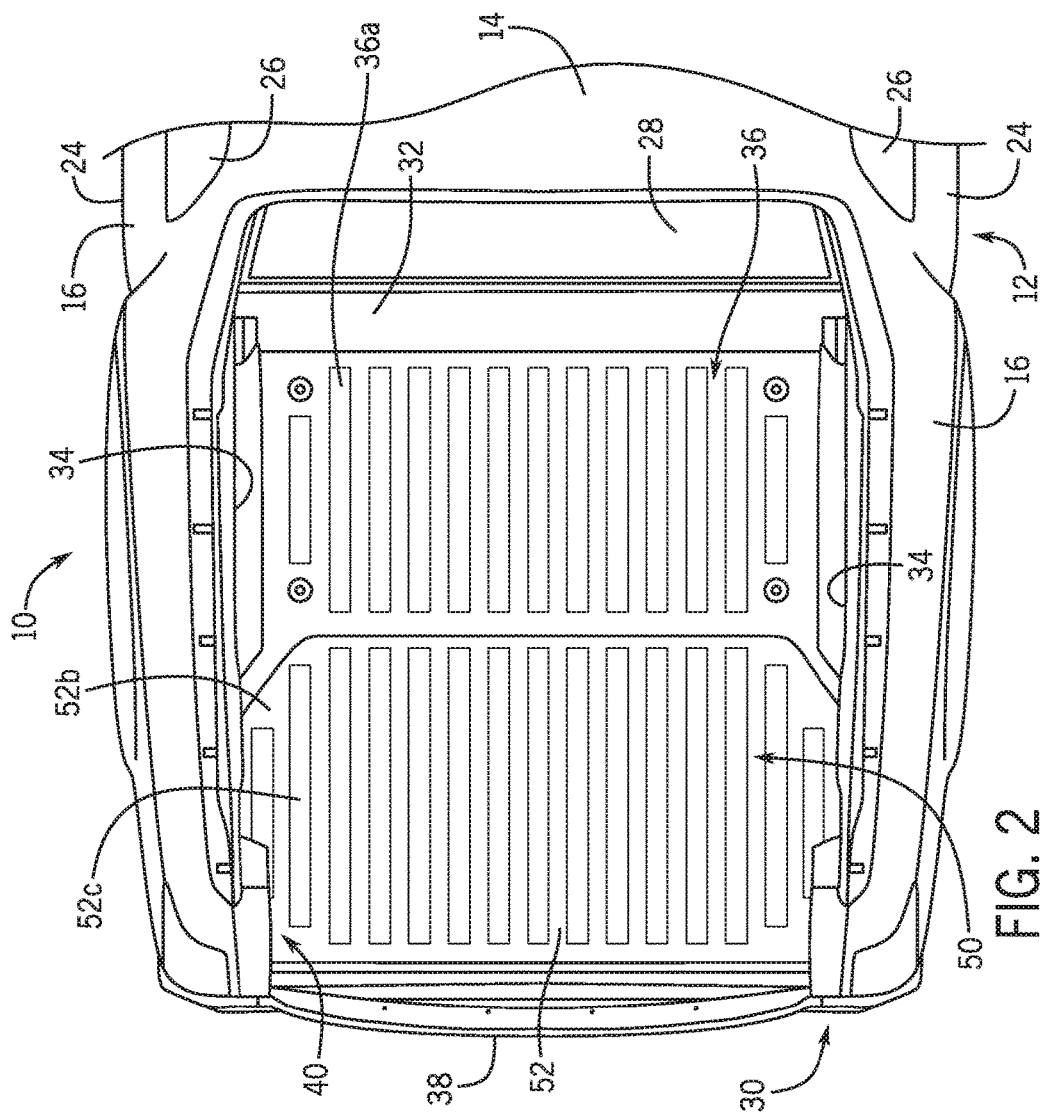
FIG. 2 is a partial plan view of the vehicle of FIG. 1 showing the combination closure and tabletop in a pivot closed view.

Referring now to the drawings, wherein the showings are for purposes of illustrating one or more exemplary embodiments only and not for limiting the same, FIGS. 1 and 2 illustrate a vehicle or truck 10 having a body structure or vehicle body 12 that can include a plurality of panels. For example, the vehicle body 12 can include a roof panel 14, a pair of rear exterior side panels 16, front side panels (not shown), a hood (not shown) and other panels to achieve the desired configuration of the vehicle 10. The vehicle body 12 can also include frame members, body members and/or other components that generally define a shell of the vehicle 10. In one embodiment, the vehicle body 12 can be a unibody-type construction, though this is not required. In other embodiments, the vehicle body 12 can include multiple body panels welded into an underlying frame structure.

Also, the vehicle 10 can include a pair of front wheels (not shown) that are rotatably coupled to the vehicle body 12 and a pair of rear wheels 20 that are also rotatably coupled to the vehicle body 12. The vehicle 10 can further include a source of motive power (not shown) that can be an internal combustion engine and/or an electric motor, and a drive train (not shown) for transporting torque from the source of motor power to the rear wheels 20 and/or the front wheels. The vehicle 10 can additionally include a cab 22 that can be at least partially defined by the vehicle body 12. For example, the cab 22 can be defined by part of the roof panel 14. The cab 22 can further include side doors 24 each having a window 26 to provide ingress and egress to an operator of the vehicle 10 and any passengers. Still further, the cab 22 can also include a rear window 28 and a front windshield (not shown).

Further, the vehicle 10 can include or have a load-carrying bed 30 that can be defined, at least in part, by the vehicle body 12. For example, the bed 30 can be defined by an interior forward panel 32, a pair of interior side panels 34 and a bed floor 36 defining a load bearing surface of the load-carrying bed 30, each of which are components of the vehicle body 12. The vehicle 10 can also include a tailgate 38 that is hingeably coupled to the load-carrying bed 30, and particularly to one of the sides of the load-carrying bed at which one of the interior side panels 34 is disposed. The load-carrying bed, including the interior forward panel 32 and the interior side panels 34, the bed floor 36 and the tailgate 38 together cooperate to define a cargo space, indicated generally at 40.

Figure 3:
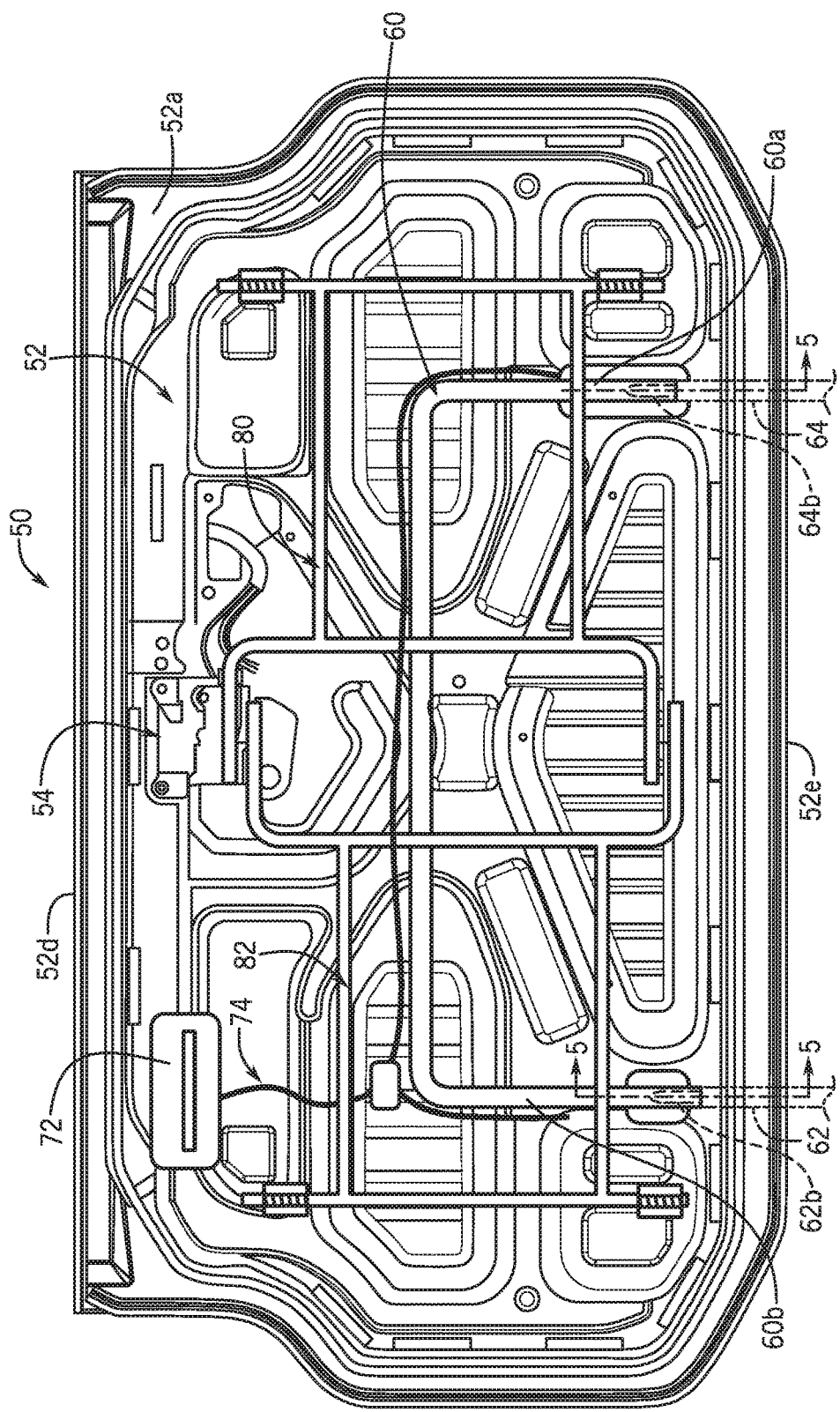
FIG. 3 is a plan view of the combination closure and tabletop showing an underside thereof in isolation from the vehicle and vehicle body.

The vehicle 10 can further include a sub-structure, or container 44 that can be supported by and extend beneath the bed floor 36 as shown in FIG. 1. The container 44 defines a storage compartment 46 disposed below the bed floor 36 and accessible through an opening 48 defined in the bed floor 36. The vehicle body 12 further includes a combination closure and tabletop 50 for the vehicle 10 according to an exemplary embodiment. In particular, and with additional reference to FIG. 3, the combination closure and tabletop 50 includes a closure body 52 pivotally and removably connected to the bed floor 36 for selectively closing the storage compartment 46.

Figure 4:
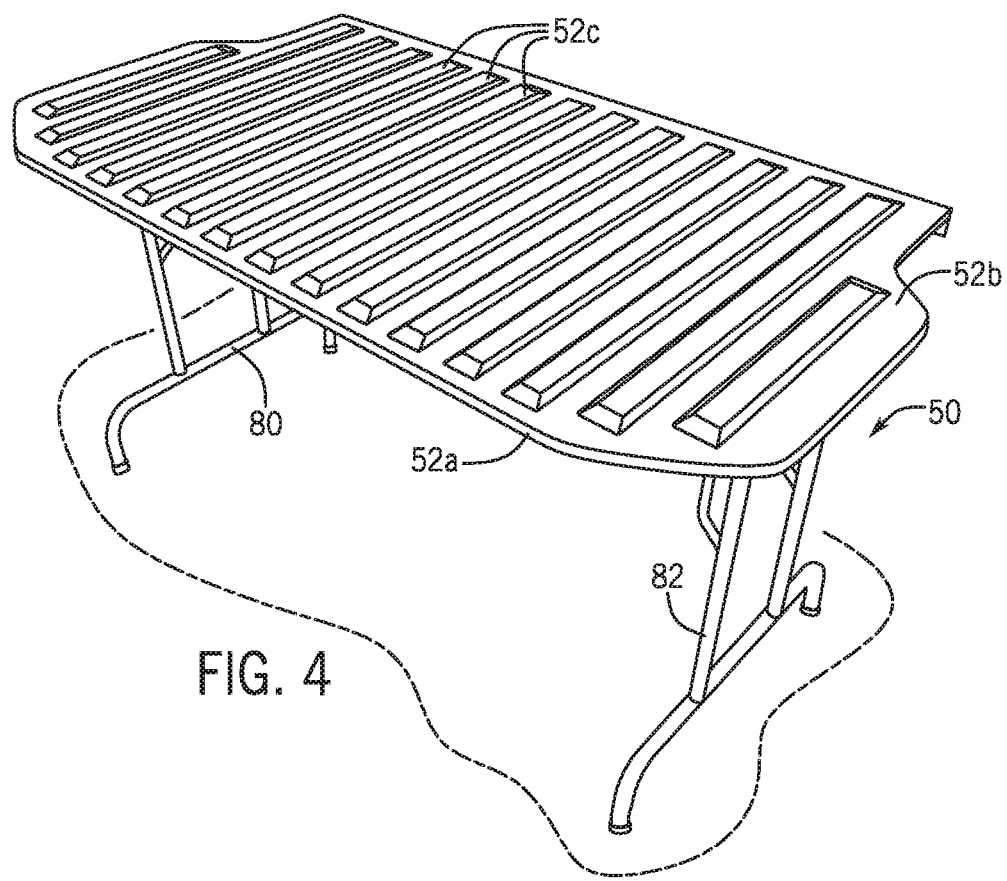
FIG. 4 is a perspective view of the combination closure and tabletop showing the same in a tabletop configuration wherein underside legs of the combination closure and tabletop are in an upright state to support the combination closure and tabletop in the tabletop configuration.

As will be described in more detail, the closure body 52 is connected to the bed floor 36 when in a closure state for selectively providing and inhibiting access to the storage compartment 46 disposed below the bed floor 36 and the closure body 52 is removable from the bed floor 36 when in a tabletop state for use in a tabletop configuration. Thus, the combination closure and tabletop, in particularly the closure body 52 thereof, is pivotal, when connected to the bed floor 36, between a pivot closed position (the position shown in FIG. 2) for closing access to the storage compartment 46 and a pivot open position (the position shown in FIG. 1) for allowing access to the storage compartment 46. The combination closure and tabletop 50, and particularly the closure body 52 thereof, is removable from the bed floor 36 for use in the tabletop configuration (shown in FIG. 4) when disconnected from the bed floor 36. Accordingly, when in the closure state, the closure body 52 is pivotable from the pivot closed position of FIG. 2 to the pivot closed position of FIG. 1. The pivot closed position is for inhibiting access into the storage compartment 46, wherein the pivot open position is for providing access into the storage compartment 46. When in the tabletop state, the closure body 52 is useful as a tabletop (see FIG. 4) and access is simultaneously provided into the storage compartment 46.

The combination closure and tabletop 50 can also include one of a latch member or latch device 54 and a mating latch member or striker 56 mounted adjacent a rearward end 52d thereof that is opposite a forward end 52e at which the combination closure and tabletop 50 is pivotally connected to the bed floor 36, and the other of the latch device 54 and the striker 56 is mounted to the bed floor 36 to enable the latch device 54 to latch onto the striker 56 and hold the combination closure and tabletop in the pivot closed position of FIG. 1. As is known, the latch device 54 can be selectively lockable onto the striker 56 to prevent unwanted access into the storage compartment 46. In the illustrated embodiment, the latch device 54 is disposed on the closure body 52 and the striker 56 is mounted on the bed floor 36 so that the latch device 54.

The combination closure in tabletop 50, and particularly the closure body 52 thereof, can include a lower side 52a and an upper side 52b opposite the lower side 52a. The upper side 52b can be structurally configured for exposure to exterior elements. For example, the upper side 52b can be structurally configured in a like manner as the bed floor 36 since both the upper side 52b of the closure body 52 and the bed floor 36 are exposed to exterior elements on the vehicle 10. In one embodiment, such structural configuration for the closure body 52 and the bed floor 36 can include forming both the upper side 42b of the combination closure and tabletop 50 and the bed floor 36 of sheet molding compound (SMC).

In the illustrated embodiment, the bed floor 36 includes a plurality of bed floor longitudinally extending, spaced apart raised ridges 36a for directly supporting cargo carried in the load-carrying bed 30. Likewise, the upper side 52b of the closure body 52 includes a plurality of closure longitudinal extending, spaced apart raised ridges 52c for directly supporting cargo. As best shown in FIG. 2, the individual raised ridges of the plurality of closure longitudinal extending, spaced apart raised ridges 52c can correspond and be arranged in alignment with the individual raised ridges of the plurality of bed floor longitudinal extending, spaced apart raised ridges 36a.

Figure 5:
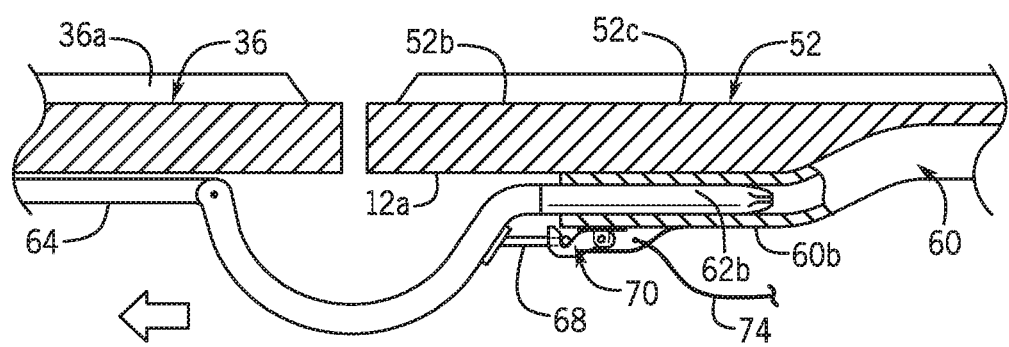
FIG. 5 is partial cross-section view taken along the line 5-5 of FIG. 3 to show the removable connection between the combination closure and tabletop with the hinge legs of the vehicle.

In the illustrated embodiment, the combination closure and tabletop 50 can include a stiffener frame 60, which can at least be partially embedded within the combination closure and tabletop 50, and particularly embedded within the closure body 52, at least partially as shown in FIG. 5, between the lower side 52a and the upper side 52b of the combination closure and tabletop 50. In addition, or in the alternative, the stiffener frame 60 can be otherwise secured to the lower side 52a of the closure body 52 (e.g., via appropriate fasteners, such as bolts or the like). Hinged legs 62, 64 can be hingedly connected to the bed floor 36 via hinges (only hinge 66 is schematically shown in FIG. 1).

The stiffener frame 60 can include stiffener legs 60a, 60b that are removably attached to the hinged legs 62, 64 to provide a removable connection between the bed floor 36 and the combination closure and tabletop 50. The hinged legs 62, 64 hingedly connect to the bed floor 36 to enable pivoting of the combination closure and tabletop 50 when the stiffener legs 60a, 60b are secured (via the removable connection) to the hinged legs 62, 64. More particularly, the hinged legs 62, 64 each include a distal portion 62a, 64a that is insertable into a corresponding one of the stiffener legs 60a, 60b when the stiffener legs 60a, 60b are removably attached to the hinged legs 62, 64 as shown in FIG. 1.

With further particular reference to FIG. 5, the removable connection between the stiffener leg 60b of the stiffener frame 60 and the hinged leg 62 is shown and will be described in specific detail in accord with a one embodiment. It will be appreciated that discussion concerning removable connection between the stiffener leg 60b and the hinged leg 62 applies to the removable connection between the stiffener leg 60b and the hinged leg 64. To lock the stiffener legs 60a, 60b to the hinged legs 62, 64, the vehicle body 12 can further include a striker 68 mounted to at least one of the hinged legs 62 or 64 and a latch 70 mounted to a corresponding one of the stiffener legs 60a or 60b for selectively latching onto the striker 68 when the combination closure and tabletop 50 is secured to the bed floor 36. In FIG. 5, the striker 68 is fixably disposed on the hinged leg 62 adjacent to the distal portion 62a thereof and the latch 70 is mounted to the stiffener leg 60a of the stiffener frame 60. Though not shown, a second striker and corresponding latch can be provided on the stiffener leg 60b and the hinged leg 64.

A release actuator 72 (schematically shown in FIG. 3) can be mounted in remote spaced relation relative to the latches 70 and operatively connected thereto by a mechanical translator 74 (e.g., a cable or other mechanical linkage) such that actuation of a release actuator 72 disengages the latch or latches 70 from their respective strikers 68 to enable disconnection of the combination closure and tabletop 50 from the bed floor 36. As shown, the release actuator 72 can be mounted to the underside or lower side 52a of the combination closure and tabletop 50 adjacent a rearward end 52d of the combination closure and tabletop 50 that is opposite a forward end 52e at which the stiffener legs 60a and 60b are exposed. In other words, the release actuator 72 is mounted distally relative to the hinged edge, which is the forward end 52e, of the closure body 52. The release actuator is actuatable via the mechanical translator 74 to disconnect the closure body 52 from the bed floor 36 so that the combination closure and tabletop 50 can be removed and displaced relative to the vehicle 10. In the illustrated embodiment, the mechanical translator 74 includes a cable portions 74a-74c with the cable portion 74a connected to the cable portions 74b and 74c through a cable splitter 74d that translates actuation movement from the release actuator 72 and the cable portion 74a to the cable portions 74b and 74c and thereby to the latches 70.

Figure 6:
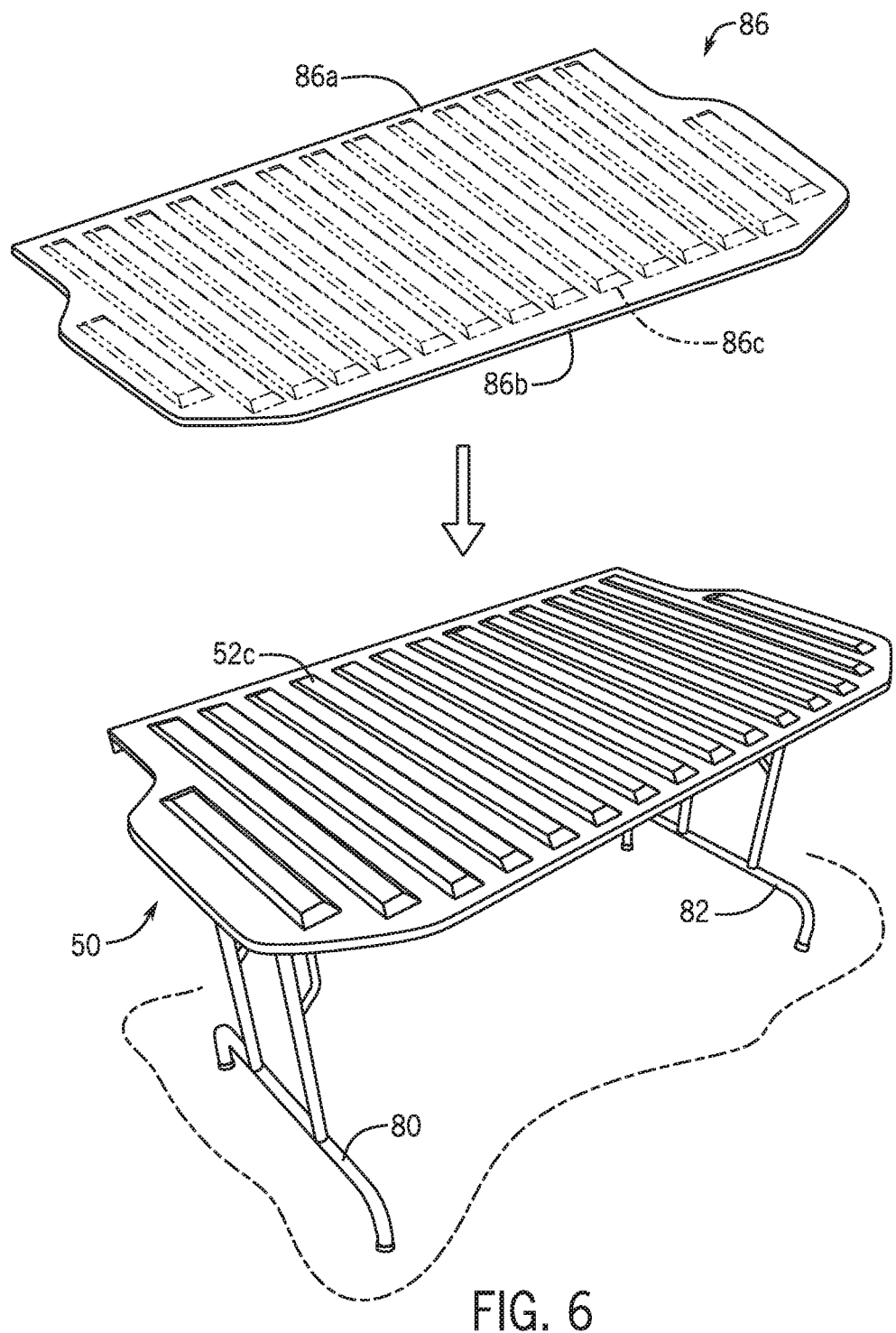
FIG. 6 is a perspective view similar to FIG. 4 but showing a tabletop mat complementarily being applied to the upper side of the combination closure and tabletop to provide a flat, planar surface.

The combination closure and tabletop 50 can further include table legs 80, 82 removable to secure to the lower side 52a of the closure body 52 when the table legs 80, 82 are in a stowage or storage state. The table legs 80, 82 are removable from the stowage state (shown in FIGS. 1 and 3) to an upright state (shown in FIGS. 4 and 6) wherein the table legs 80, 82 are perpendicularly oriented relative to the lower side 52a of the closure body 52 to support the combination closure and tabletop 50 in the upright configuration. In particular, the table legs 80, 82 are configured to support the closure body 52 in a tabletop configuration when the closure body 52 is removed from the bed floor 36. Once in the upright configuration, a flexible mat 86 can be applied to the upper side 52b of the closure body 52. More particularly, flexible mat 84 has an upper side 84a and a lower side 84b. The lower side 84b of the flexible mat 86 can have longitudinal recesses 84c that complementarily receive the closure longitudinal extending, spaced apart raised ridges 52c. As a result, the upper side 84a of the flexible mat 84 is substantially planar as shown to provide a flat tabletop surface.

A method for using a combination closure and tabletop in a vehicle will now be described. In particular, the method will be described in association with the vehicle 10 and combination closure and tabletop 50 described hereinabove, though it is to be appreciated and understood that the method could be used with other vehicles, vehicle bodies and/or combination closures and tabletops. In the method, the combination closure and tabletop 50 is pivoted from the pivot closed position of FIG. 3 to the pivot open position shown in FIG. 1. As discussed above, the combination closure and tabletop 50 closes the storage compartment 46 disposed below the exterior bed floor 36 when in the pivot closed position.

Next, the combination closure and tabletop 50 can be quick disconnected from the bed floor 36. In particular, the stiffener legs 60a, 60b can be removed from the hinged legs 62, 64 by removing the distal portions (e.g., distal portion 62a) from the stiffener legs 60a, 60b to detach the closure body 52 from the bed floor 36. In the illustrated embodiment, this can be facilitated via the release actuator 72 by carefully communicating via the mechanical translator 74 to the strikers and latches 70. In particular, the release actuator 72 can be actuated to cause the latches 70 to release from their respective strikers 68 to unlock the hinged legs 62, 64 from the stiffener legs 60a, 60b. After the quick disconnect, the combination closure and tabletop 50 can be remotely used in the tabletop configuration. For example, the combination closure and tabletop 50 can be carried to a location spaced apart from the vehicle 10 and set up in the tabletop configuration as described hereinabove. Such remote use of the combination closure and tabletop 50 and the tabletop configuration can include pivoting the table legs 80, 82 that are movably secured to the underside 52a of the closure body 52 to the upright position.

When finished with the combination closure and tabletop 50 and the tabletop configuration, the table legs 80, 82 can be pivoted back to the stowage state wherein the table legs 80, 82 are moved to rest against the lower side 52a of the closure body 52, the combination closure and tabletop 50 can then be carried back to the vehicle 10. The hinged legs 62, 64 can be reinserted into the stiffener legs 60a, 60b and the latches 70 relatched onto the strikers 68 to again secure the combination closure and tabletop to the bed floor 36. Finally, the closure body 52 can be moved from the pivotal position back to the pivot closed position to close the storage compartment 46. This can include the latch member 54 latching onto its corresponding striker and optionally a lock can be provided and used to lock the combination closure and tabletop 50 in the pivot closed position.

It will be appreciated that various of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A vehicle body having a load-carrying bed, the body comprising:
   a bed floor defining a load bearing surface of the load-carrying bed;
   a storage compartment disposed below the bed floor and accessible through an opening defined in the bed floor; and
   a combination closure and tabletop pivotally and removably connected to the bed floor for selectively closing the storage compartment, the combination closure and tabletop pivotable, when connected to the bed floor, between a pivot closed position for closing access to the storage compartment and a pivot open position for allowing access to the storage compartment, the combination closure and tabletop removable from the bed floor for use in a tabletop configuration when disconnected from the bed floor.

2. The vehicle body of claim 1 wherein the combination closure and tabletop includes a lower side and an upper side opposite the lower side, the upper side structurally configured for exposure to exterior elements.

3. The vehicle body of claim 2 wherein both the upper side of the combination closure and tabletop and the bed floor are formed of sheet molding compound.

4. The vehicle body of claim 1 wherein the combination closure and tabletop includes a lower side and an upper side opposite the lower side and wherein the bed floor includes a plurality of bed floor longitudinal extending, spaced apart raised ridges for directly supporting cargo, and wherein the upper side includes a plurality of closure longitudinal extending, spaced apart raised ridges for directly supporting cargo, the individual raised ridges of the plurality of closure longitudinal extending, spaced apart raised ridges correspond and are arranged in alignment with the individual raised ridges of the plurality of bed floor longitudinal extending, spaced apart raised ridges.

5. The vehicle body of claim 4 further including table legs removably secured to the lower side in a stowage state, the table legs movable from the stowage state to an upright state wherein the table legs support the upper side in the tabletop configuration.

6. The vehicle body of claim 5 wherein the table legs are pivotally movable between the stowage state wherein the legs are secured against the lower side and the upright state wherein the legs are perpendicularly oriented relative to the lower side to support the combination closure and tabletop in an upright configuration.

7. The vehicle body of claim 4 further including a flexible mat having an upper side and a lower side, the lower side of the flexible mat has longitudinal recesses that complementarily receive the closure longitudinal extending, spaced apart raised ridges, the upper side substantially planar to provide a flat tabletop surface.

8. The vehicle body of claim 1 further including a stiffener frame at least partially embedded within the combination closure and tabletop between an upper side and a lower side of the combination closure and tabletop.

9. The vehicle body of claim 8 wherein hinge legs are hingedly connected to the bed floor and the stiffener frame includes stiffener legs removably attached to the hinge legs to provide the removable connection between the bed floor and the combination closure and tabletop, the hinge legs hingedly connected to the bed floor to enable pivoting of the combination closure and tabletop when the stiffener legs are secured to the hinge legs.

10. The vehicle body of claim 9 wherein the hinge legs each include a distal portion insertable into a corresponding one of the stiffener legs when the stiffener legs are removably attached to the hinge legs.

11. The vehicle body of claim 9 further including:
a striker mounted to at least one of the hinge legs; and
a latch mounted to the corresponding one of the stiffener legs for selectively latching onto the striker when the combination closure and tabletop is secured to the bed floor.

12. The vehicle body of claim 11 further including:
a release actuator mounted in remote spaced relation relative to the latch and operatively connected thereto by a mechanical translator such that actuation of the release actuator disengages the latch from the striker to enable disconnection of the combination closure and tabletop from the bed floor.

13. The vehicle body of claim 12 wherein the release actuator is mounted to an underside of the combination closure and tabletop adjacent a rearward end of the combination closure and tabletop that is opposite a forward end at which the stiffener legs are disposed.

14. The vehicle body of claim 1 wherein the combination closure and tabletop includes each of a latch device and a striker, wherein one of the latch device and the striker is mounted adjacent a rearward end thereof that is opposite a forward end at which the combination closure and tabletop is pivotally connected to the bed floor, and wherein the other of the latch device and the striker is mounted to the bed floor to enable the latch device to latch onto the striker to hold the combination closure and tabletop in the pivot closed position, the latch device selectively lockable onto the striker.

15. A combination closure and tabletop for a vehicle, comprising:
a closure body pivotally and removably connected to a bed floor of the vehicle that defines a load bearing surface of a load-carrying bed on the vehicle, the closure body connected to the bed floor when in a closure state for selectively providing and inhibiting access to a storage compartment disposed below the bed floor, the closure body removable from the bed floor when in a tabletop state for use in a tabletop configuration,
wherein, when in the closure state, the closure body pivotable from a pivot closed position to a pivot open position, the pivot closed position for inhibiting access into the storage compartment, the pivot open position for providing access into the storage compartment,
and wherein, when in the tabletop state, the closure body is usable as a tabletop and access is provided into the storage compartment.

16. The combination closure and tabletop of claim 15 wherein the closure body has an upper surface formed of sheet molding compound for exposure to exterior elements encountered by the vehicle.

17. The combination closure and tabletop of claim 16 wherein the closure body has a lower side, opposite the upper side, to which table legs are removably secured, the table legs configured to support the closure body in the tabletop configuration when the closure body is removed from the bed floor.

18. The combination closure and tabletop of claim 15 further including a release actuator mounted distally relative to a hinged edge of the closure body, the release actuator actuatable to disconnect the closure body from the bed floor.

19. A method for using a combination closure and tabletop in a vehicle, comprising:
pivoting the combination closure and tabletop from a pivot closed position to a pivot open position, wherein the combination closure and tabletop closes a storage compartment disposed below an exterior bed floor of the vehicle when in the pivot closed position;
quick disconnecting the combination closure and tabletop from the bed floor; and
remotely using the combination closure and tabletop in a tabletop configuration.

20. The method of claim 19 wherein quick disconnecting includes actuating a release actuator to disconnect a stiffener leg fixedly secured to the combination closure and tabletop from a hinge leg fixedly and hingedly connected to the bed floor, and wherein remotely using the combination closure and tabletop in the tabletop configuration includes pivoting table legs movably secured to an underside of the combination closure and tabletop to an upright position.

* * * * *